(No Model.) 2 Sheets—Sheet 2.
J. M. PENDLETON.
SYSTEM FOR REGULATING AND CONTROLLING ELECTRIC MOTORS.
No. 343,393. Patented June 8, 1886.
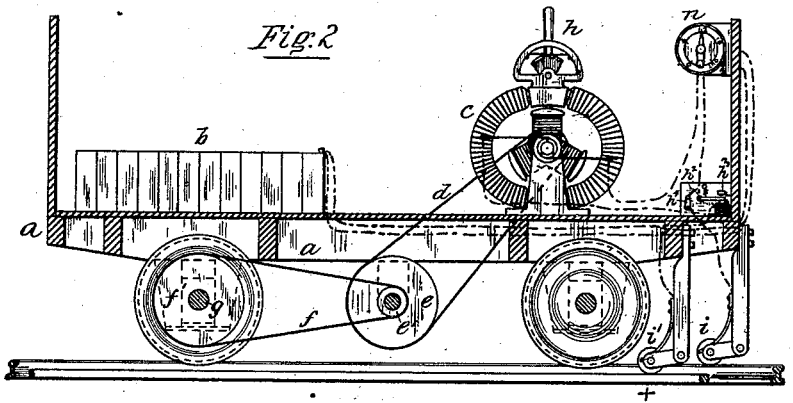
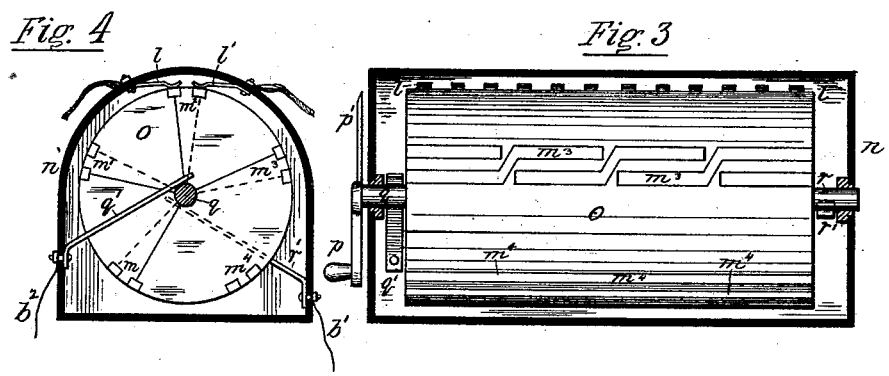
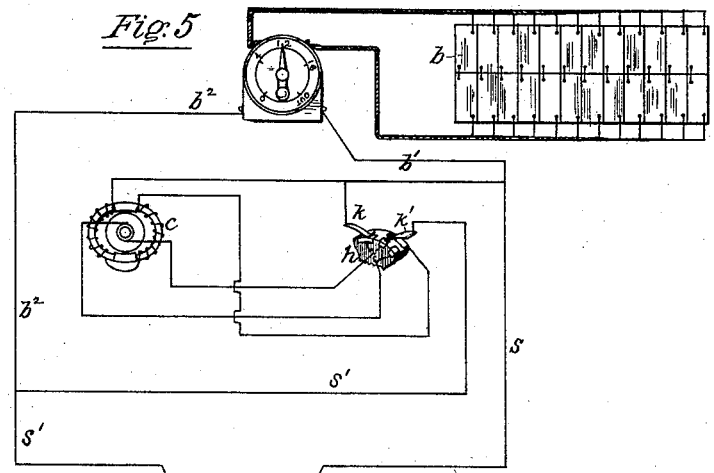
Witnesses
H. D. Williams
A. G. Holcombe
John M. Pendleton.
Inventor
per
Alfred Shedlock.
Atty.
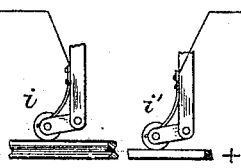

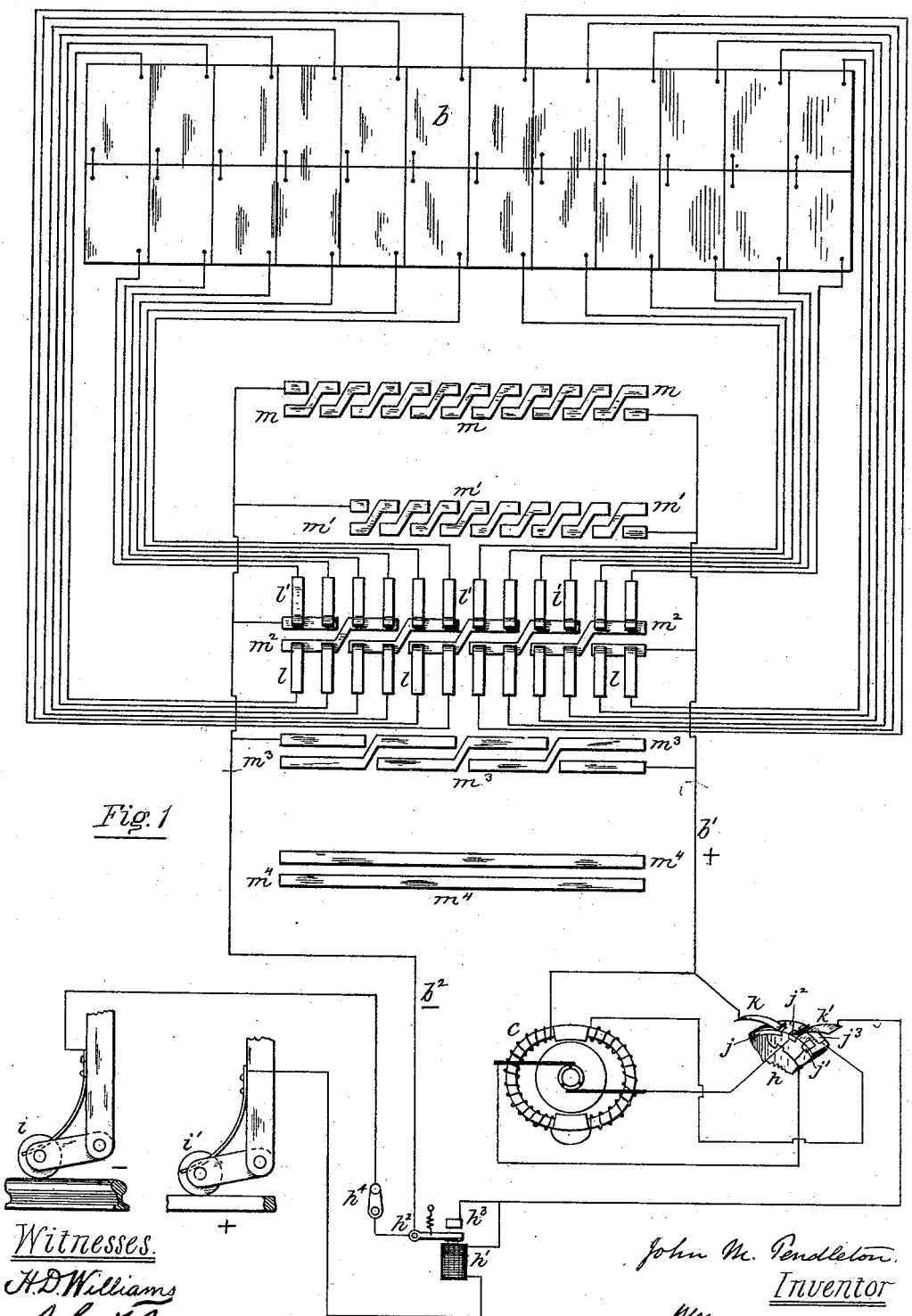

UNITED STATES PATENT OFFICE.

JOHN M. PENDLETON, OF NEW YORK, N. Y.

SYSTEM FOR REGULATING AND CONTROLLING ELECTRIC MOTORS.

SPECIFICATION forming part of Letters Patent No. 343,393, dated June 8, 1886.

Application filed March 1, 1886. Serial No. 193,553. (No model.)

*To all whom it may concern:*

Be it known that I, JOHN M. PENDLETON, a citizen of the United States, residing at New York, county and State of New York, have invented certain new and useful Improvements in Regulating and Controlling Electromotors, of which the following is a specification.

The United States Letters Patent granted to me July 25, 1885, under No. 323,199, embraces novel features in systems of electric locomotion operated by self-propelling cars, consisting of a car provided with an accumulator or storage-battery working on a line provided with fixed conductors charged from a stationary source of electricity, said accumulators being charged while the motor is receiving current from the fixed conductors, and the energy stored therein subsequently utilized to actuate the motor on extensions or parts of the line unprovided with charging-conductors.

Now, this invention relates to electrical self-propelling cars operated on the above-described system, and has for its object to regulate and control the electromotor and compensate for the varying resistance of the charging-circuit between the motor-car and the stationary source of electricity as said car changes its position on the line, by altering the arrangement and combinations of the accumulator-cells so that the electro-motive force of the accumulator is caused to vary in such relation to the variations of resistance of the charging-circuit that an approximately uniform amount of electrical energy is supplied to and utilized in the motor at all parts of the line. A suitable switch is employed to variously arrange the elements or cells of the accumulator, which, while providing for the application of a constant amount of energy to the motor as the resistance of the charging-circuit varies, also provides means for regulating the speed of the motor on any part of the line by opposing to the electro-motive force of the charging-current varying electro-motive forces from the accumulator. The total electro-motive force of the accumulator when in series with the motor with its cells arranged in single series may be such as to entirely oppose that of the charging source and cut off all current from the motor-circuit.

The principle of this invention—the utilization of a variable electro-motive force to compensate for varying resistance of an electric circuit, and to regulate the amount of energy supplied to electromotors—is adapted to be applied to any system in which electricity is used as a motive power, whether the motor and accumulator are in multiple arc or placed in a single circuit or series. If the multiple-arc system be used, the cells of the accumulator must be so arranged that its electro-motive force is increased when the charging-circuit increases in resistance; and if the single series be used, then the cells of the accumulator will require a combination giving a decrease of electro-motive force when the charging-circuit increases in resistance.

Heretofore the regulation of electromotors to compensate for variations in the current supplied thereto has been accomplished by introducing varying dead-resistances into the circuit or shunting part of the current through varying resistances. Such excess of current acting on the included dead-resistances in the circuit or shunted around the motor to be regulated is lost as useful energy by being dissipated in the form of heat in said resistances. Now, by my substitution of an accumulator or storage-battery for such dead-resistances the excess of current is preserved by causing chemical action in the accumulator, which, as stored energy, may be subsequently utilized in operating the electromotor. When applied to regulate the motor of a self-propelling car, this stored excess of energy is fully utilized as useful energy in actuating the motor, which may be done on any portion of the main line when the accumulator has become charged by breaking the charging-circuit and completing the circuit of the motor with the accumulator; or said stored energy may be utilized in actuating the self-propelling cars on non-electric branch lines or extensions, as before indicated.

In the accompanying drawings, forming part of this specification, Figure 1, Sheet 1, is a diagram view giving the connections and arrangements of the various devices used in my improved system of regulating and controlling electromotors. Fig. 2, Sheet 2, is a sectional view of an electrical self-propelling car provided with my improvements. Fig. 3, Sheet 2, is a side view of the commutating-switch for changing the arrangement of combinations of the cells of the accumulator with the case in section. Fig. 4, Sheet 2, is an end view of the same with the dial removed; and Fig. 5, Sheet 2, is a diagram view showing the accumulator and electromotor arranged in multiple-arc.

It is premised that the number of cells or divisions of the accumulator and the number of combinations in which the cells or divisions may be placed to vary the counter electro-motive force opposed to the charging-current will be such as to meet the requirements of each application of my improved motor regulating and controlling system, the number of cells and divisional arrangements thereof shown in Fig. 1, and now described, being selected for easy explanation of the system. The accumulator $b$ comprises twenty-four cells connected together in pairs, the positive terminal of each pair of cells being provided with a brush, $l$, and the negative terminal with a brush, $l'$. These brushes $l$ and $l'$ are arranged in two rows, and bear on the contact-blocks of the commutating-switch. The upper set of contact-blocks, $m$, when brought under the brushes $l$ and $l'$, arrange all of the twenty-four cells of the accumulator in single series. The second set of blocks, $m'$, arrange twenty of the cells in single series, leaving four cut out. The third set, $m^2$, with which the brushes $l$ and $l'$ are represented in contact, arrange twenty-four cells in double series of twelve each. The fourth set, $m^3$, arrange twenty-four cells in triple series of eight each. The end block of the row of each set upon which the positive brushes $l$ bear is connected to the line $b'$, and the end block of the row of each set upon which the negative brushes $l'$ bear is connected to the line $b^2$. These lines $b'$ and $b^2$ are respectively marked $+$ and $-$, to indicate the direction of energy of the counter electro-motive force of the accumulator. The lower isolated blocks or strips, $m^4$, of the commutating-switch, when brought under the brushes of the accumulator, connect all the positive and negative terminals of the pairs of cells, respectively, together for the purpose of equalizing the stored energy and electro-motive force of all the cells. The more strongly charged cells give up some of their energy to the weaker ones. In other words, the electric energy stored in the accumulator, if irregularly divided between the different cells, is by this means equally and uniformly distributed among them. This part of the switch may be brought into action at any time when the motor in the circuit is not in use. The line $b'$ joins the contact-brush $k$ of the switch $h$ of the motor $c$, the other brush, $k'$, of which is connected by a line to the coil $h'$ of an automatic switch, and to the contact-block $h^3$, by which block the armature $h^2$ closes the circuit of the line $b^2$ with the brush $k'$ when the armature $h^3$ is retracted from the magnet of the automatic switch. The coil $h'$ is also connected to the contact brush or roller $i'$, which electrically connects the car to the $+$ conductor of the line. The $-$ conductor of the line is, through the medium of the brush or roller $i$, connected by a line to the armature $h^2$. These line-connections and the automatic switch $h'$ $h^2$ $h^3$ and the hand-switch $h^4$ are fully described in my before-mentioned Letters Patent, the function of the automatic switch being to close and complete the circuit of the accumulator with the motor when the car passes from a part of the line provided with charging-conductors to a part of the line unprovided therewith, or when the charging-current ceases or is cut off from the motor-circuit from any cause. The electromotor used in this system is shunt-wound, one end of the field-magnet wire being connected to the line $b'$ and the other end to the contact-block $j^3$ of the switch $h$; and one end of the armature circuit joins the block $j^2$, and the other end joins the blocks $j$ and $j'$. The brush $k'$ is wide enough to bear on the blocks $j^3$ and $j'$ or $j^2$; but the other brush, $k$, never touches the block $j^3$. When both brushes are on the block $j$, the motor is cut out of circuit, but the accumulator-circuit remains closed; and when the brushes are in the position shown in Fig. 1—viz., the brush $k$ on the block $j$ and the brush $k'$ on the blocks $j^2$ and $j^3$—the current is divided between the field system and the armature of the motor. By moving the commutator $h$ so that the brush $k$ is on the block $j^2$ and the brush $k'$ on the blocks $j'$ and $j^3$ the direction of the current is reversed in the armature, but traverses the field-system wire in the same direction as before, thus providing means for changing the direction of rotation of the armature. The whole circuit is broken by setting the switch $h$ so that the brushes $k$ and $k'$ rest, respectively, on the insulating material of the switch between the blocks $j$ and $j^2$ and between the blocks $j^2$ and $j'$. It is evident that this method of regulating electromotors is adapted to be applied to all electric-motor systems, and it will be understood that all the devices, &c., shown in Fig. 1, with the exception of the charging-conductors, marked $+$ and $-$, are carried on the self-propelling car when this method is applied to electric locomotion.

In Fig. 2 $a$ represents the body of a car or truck; $b$, the accumulator; $c$, the electromotor, which is connected to the axle $g$ of the car through the medium of the belt $d$, the pulleys $e$ $e'$, located under the bottom of the car, the belt $f$, and the pulley $f'$ on the axle $g$. The commutating-switch $n$ is fastened to a standard on the car, and the motor-switch $h$ is placed on the top of the motor, so that these instruments are in handy position to be manipulated by the attendant. The line-contact brushes $i$ and $i'$ are carried by brackets projecting downwardly from the car, and the automatic switch $h'$ $h^2$ is arranged on the floor of the car, directly over the brushes.

The disposition of the various devices on the car may be changed, as desired, their arrangement as here given being for easy explanation.

The main wires of the circuits are shown by dotted lines.

The construction of a commutating-switch, $n$, adapted to arrange the cells of the accumulator in various combinations, is shown at Figs. 3 and 4. The contact-blocks $m$, $m'$, $m^2$, $m^3$, and $m^4$ are attached to the cylinder $o$ of insulating material. This cylinder is provided with a handle, $p$, by which it may be rotated, so as to bring any of the sets of blocks $m\ m'$, &c., under the two sets of accumulator-brushes $l$ and $l'$, and also a pointer, $p'$, for indicating on a dial the positions of the brushes $l$ and $l'$ on the cylinder. Said dial may be marked with any arbitrary characters indicative of the various arrangements and combinations of the cells of the accumulator. In the case in point figures are used representing the proportional gradation of energy supplied to the motor, the normal working-current being represented by 12, and when the pointer is opposite thereto, as shown in Figs. 2 and 5, the brushes $l$ and $l'$ are in contact with the blocks $m^2$, as shown in Figs. 1 and 4. One half of the energy is now taken up by the accumulator, leaving the other half to actuate the motor. Now, as the outside or charging circuit increases in resistance a less quantity of current will flow; but the electro-motive force will remain the same. To cause a uniform amount of energy to pass to or through the motor, the blocks $m^3$ are moved under the brushes $l$ and $l'$, bringing the pointer opposite the number 16, to indicate that two-thirds of the energy is now supplied to the motor, and one-third is taken up by the accumulator. If at any time it is desired to retard the speed of the motor, the blocks $m'$ may be brought under the brushes $l$ and $l'$, thereby causing four-fifths of the energy to be taken up by the accumulator, leaving only one-fifth of the energy to actuate the motor; and when the blocks $m$ are brought under the brushes $l$ $l'$, the full strength of the accumulator is brought into action, which opposes and counteracts the electro-motive force of the current. The pointer then stands opposite the zero on the dial. By setting the pointer opposite the word "out," the brushes are caused to bear on the blocks $m^4$, the cells of the accumulator then being in position to equalize one another, and the working-circuit broken. The end blocks of the rows of the different series $m\ m'$, &c., on which the brushes $l$ bear, are all connected to the shaft $q$, which is by the brush $q'$ connected to the line $b^2$, and the end blocks of the other row of these series $m$ $m'$, &c., on which the brushes $l'$ bear, are joined to the shaft $r$, which is connected to the line $b'$ by the brush $r'$.

The manner in which the various devices are connected together when my improved method of regulating and controlling electromotors is applied to systems in which the motor and accumulator are arranged in multiple arc is shown at Fig. 5. The motor $c$, its circuits and switch $h$, are as before described, as is also the arrangement of the cells of the accumulator $b$ and the commutating-switch $n$, the principle difference between the two systems being that the line collecting-brush $i'$ is connected by the line $s$ to the juncture of the line $b'$ with the brush $k$ of the motor-switch, and the collecting-brush $i$ is connected by the line $s'$ to the brush $k'$ of the motor-switch as well as to the line $b^2$, from the accumulator. The automatic switch $h\ h'\ h^2\ h^3$ is in this case unnecessary, as the circuit of the accumulator and motor is complete when the charging-circuit is broken at the brushes $i\ i'$. In this case an increase of counter electro-motive force is required in the accumulator-circuit when the line-resistance increases, so the pointer $p'$ of the commutating-switch $n$ is then set opposite 4 on the dial, which so arranges the cells of the accumulator that a higher counter electro-motive force is opposed to the current in this branch of the circuit, thereby causing more current to flow through the motor-circuit. Again, when it is desired to reduce the speed of the motor, the counter electro-motive force of the accumulator requires to be decreased, so as to allow a greater proportion of the current to pass through or to the accumulator. The pointer $p'$ is then set opposite 16 on the dial, thereby reducing the counter electro-motive force of the accumulator and decreasing the energy suppplied to the motor.

I do not here claim, broadly, the improved method of regulating electromotors and compensating for variations in the current supplied thereto by opposing to the charging-current variable counter electro-motive forces, as this forms the subject-matter of another application filed by me May 6, 1886, under Serial No. 201,290.

What I claim, and desire to secure by Letters Patent, is—

1. The improved method of operating electrical self-propelling cars, which consists in supplying the motor with a current from a stationary source of electricity, opposing to said current a counter electro-motive force and storing the excess of energy of the charging-current, and then subsequently causing such stored excess of energy to actuate the motor of the self-propelling car.

2. In a system of electric locomotion, in combination, a car provided with an electromotor and accumulator or storage-battery, electric and non-electric lines or ways, contact brushes or rollers for connecting the motor and accumulator-circuit to the charging-circuit of the electric line or way, and a commutating-switch for arranging the cells of the accumulator in various combinations, so as to oppose varying counter electro-motive forces to the charging-current.

3. In an electro-motive power system, the combination, with an electromotor and its charging-circuit, of an accumulator included in the circuit in series with the motor, having its cells arranged in single series when the charging-current is at its maximum, and a commutating-switch for arranging the cells in various combinations of multiple arc, so as to reduce the counter electro-motive force of the accumulator and compensate for variations in the charging-current, thereby regulating the energy supplied to and work performed by the motor.

4. In a system of electric locomotion, in combination, a line of rails provided with fixed electric conductors and a stationary source of electricity, a car provided with brushes or contact-makers to bear on the fixed conductors, an electromotor carried by the car and connected to and operating the running-gear thereof, an accumulator carried by the car and arranged in single series, with the motor in a circuit from the car-brushes, and a commutating-switch for changing the arrangement of the cells of the accumulator to place them in increasing multiple-arc series as the motor-car moves away from, or the opposite as the car approaches, the stationary source of electricity, and thus compensate for the increasing or decreasing resistance of the line-conductors by decreasing or increasing the counter electro-motive force of the accumulators.

In testimony whereof I have hereunto set my hand, at New York, county and State of New York, this 27th day of February, 1886.

JOHN M. PENDLETON.

Witnesses:
   H. D. WILLIAMS,
   FLOYD CLARKSON.